(12) United States Patent
Murthy et al.

(10) Patent No.: US 12,271,730 B2
(45) Date of Patent: Apr. 8, 2025

(54) COMPUTE PLATFORM FOR MACHINE LEARNING MODEL ROLL-OUT

(71) Applicant: PayPal, Inc., San Jose, CA (US)

(72) Inventors: Sudhindra Murthy, Bangalore (IN); Divakar Viswanathan, Tiruchirappalli (IN); Vishal Sood, Bangalore (IN)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/527,982

(22) Filed: Dec. 4, 2023

(65) Prior Publication Data

US 2024/0168750 A1    May 23, 2024

Related U.S. Application Data

(63) Continuation of application No. 17/398,868, filed on Aug. 10, 2021, now Pat. No. 11,868,756.

(51) Int. Cl.
| | |
|---|---|
| G06F 11/14 | (2006.01) |
| G06F 8/65 | (2018.01) |
| G06F 11/3668 | (2025.01) |
| G06N 20/20 | (2019.01) |

(52) U.S. Cl.
CPC ............ *G06F 8/65* (2013.01); *G06F 11/1469* (2013.01); *G06F 11/3688* (2013.01); *G06F 11/3692* (2013.01); *G06N 20/20* (2019.01); *G06F 2201/82* (2013.01)

(58) Field of Classification Search
CPC .. G06F 11/36; G06F 11/3692; G06F 11/3688; G06F 2201/82; G06N 20/20
See application file for complete search history.

(56) References Cited

U.S. PATENT DOCUMENTS

| | | | | |
|---|---|---|---|---|
| 2021/0400066 | A1* | 12/2021 | Sood | H04L 63/1425 |
| 2022/0129785 | A1* | 4/2022 | Vogeti | G06N 20/00 |
| 2022/0156117 | A1* | 5/2022 | Chen | G06N 20/00 |
| 2022/0197900 | A1* | 6/2022 | Maheshwari | G06F 16/90324 |
| 2022/0318675 | A1* | 10/2022 | Sawaf | G06N 20/00 |
| 2022/0366340 | A1* | 11/2022 | Chen | G06Q 10/06375 |
| 2023/0011315 | A1* | 1/2023 | Kaitha | G06F 11/3495 |

* cited by examiner

*Primary Examiner* — Kamini B Patel
(74) *Attorney, Agent, or Firm* — Haynes and Boone, LLP

(57) ABSTRACT

There are provided systems and methods for a compute platform for machine leaning model roll-out. A service provider, such as an electronic transaction processor for digital transactions, may provide intelligent decision-making through decision services that execute machine learning models. When deploying or updating machine learning models in these engines and decision services, a model package may include multiple models, each of which may have an execution graph required for model execution. When models are tested from proper execution, the models may have non-performant compute items, such as model variables, that lead to improper execution and/or decision-making. A model deployer may determine and flag these compute items as non-performant and may cause these compute items to be skipped or excluded from execution. Further, the model deployer may utilize a pre-production computing environment to generate the execution graphs for the models prior to deployment or upgrading.

20 Claims, 8 Drawing Sheets

COMPUTE PLATFORM FOR MACHINE LEARNING MODEL ROLL-OUT

CROSS REFERENCE TO RELATED APPLICATION

The present invention is a Continuation of U.S. patent application Ser. No. 17/398,868, filed Aug. 10, 2021, the disclosure of which is incorporated herein by reference in its entirety.

TECHNICAL FIELD

The present application generally relates to machine learning (ML) engines and ML model roll-out for ML engine execution, and more particularly to determining and identifying non-performant ML models during ML model package roll-out for excluding such ML models and more efficient roll-out.

BACKGROUND

Users may utilize service providers in order to access computing services provided by such service providers. These computing services may include electronic transaction processing services via online transaction processors. When accessing and utilizing these services from online platforms of the service provider, ML models and engines may be utilized for intelligent decision-making. For example, an ML engine for fraud detection may deploy one or more ML models to detect fraud or otherwise analyze risk during computing events, such as login, authentication, electronic transaction processing, and the like.

In this regard, a risk platform may include and utilize hundreds or more of ML models and these models may have dependency on thousands or more of feature engineered variables across various checkpoints during transaction processing. These checkpoints may include Pre-Transaction (login, add funding instruments, user profile updates), Transaction (money movement) and Post-Transaction (withdrawal, disputes, refunds). Apart from processing a transaction, the platform may also host several business integrations related to Credit (consumer and merchant credit), Compliance, Customer Engagements (case alerts and workflows, chatbots, etc.), and different acquisition services and/or partner services. This infrastructure runs on thousands of containers (e.g., machines or computes for data processing).

As the number of models and their feature engineered dependent variables increases, the number of moving parts increases and therefore release of new model packages and/or updates become more complicated. For example, for risk and other ML platforms, dependent variables data sources may be needed to be updated near real-time, complex data loads from various domain databases may be required, and changes in contracts between services may all lead to non-performant compute items in ML models, such as non-performant variables in ML models and/or ML models as a whole. Such non-performant compute items may impact two scenarios: a) availability to business (ATB) of systems before and after deployment of new ML model packages and updates, and b) release velocity of bundles of ML models. An ML model bundle may include many ML models, where one or more offending models cause a delay in time to market (TTM) of fraud risk solutions. Further, as the number of models increases, and their feature engineered dependent variables increase, the acyclic graph, such as a directed acyclic graph (DAG), that is created during the startup (e.g., which provides a run time execution of graphs for dependent variables) equates to complex data loads from various domain databases. As such, the dependency graph construction and initialization during startup may lead to delay during the startup.

Figure 1:
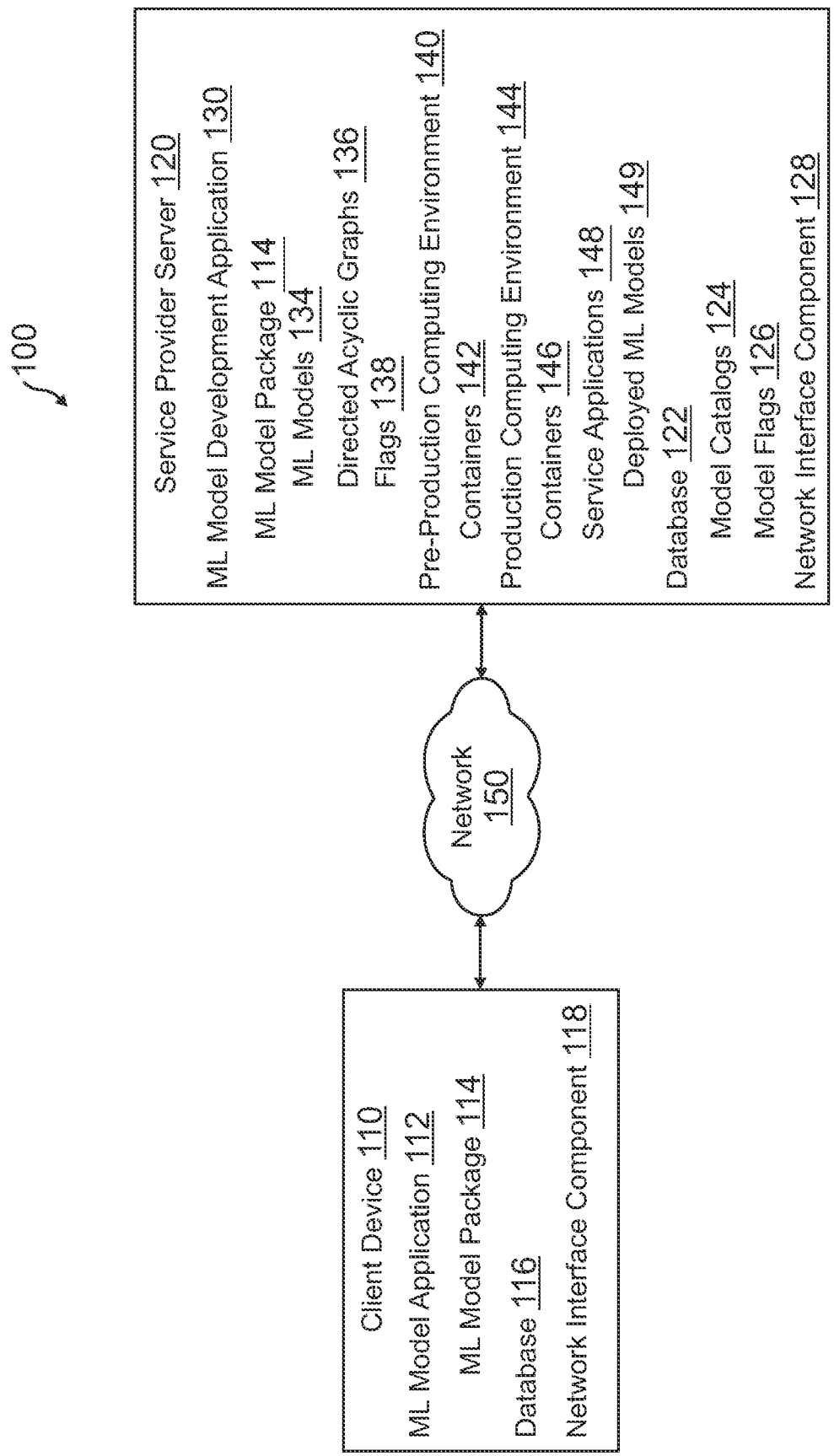
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a compute platform for machine leaning model roll-out. Systems suitable for practicing methods of the present disclosure are also provided.

In network communications, such as between online platforms and systems for service providers and end users' client devices, electronic platforms and computing architecture may provide computing services to users and computing devices. For example, online transaction processors may provide computing and data processing services for electronic transaction processing between two users or other entities (e.g., groups of users, merchants, businesses, charities, organizations, and the like). A user may utilize online service providers, such as transaction processors, via their available online and networked platforms. For example, a user may make a payment to another user or otherwise transfer funds using the online platforms of the service providers. When accessing online platforms and utilizing the corresponding computing resources, ML models and engines are utilized for intelligent decision-making. However, these models are often updated, new models are deployed, and the ML engines are otherwise optimized for better decision-making and more accurate ML predictions and execution. Model deployment with large systems and hundreds, if not thousands, of ML models, data variables, and containers (e.g., machines or computes running and executing the ML models in a production computing system and environment) may be inefficient and cause delays in TTM or other deployment times. In this regard, a system may minimize the impact on ATB and maximize throughput during model roll-out and deployment.

In some service provider systems, such as online transaction processors, a user may wish to process a transaction, such as for a payment to another user or a transfer. A user may pay for one or more transactions using a digital wallet or other account with an online service provider or transaction processor (e.g., PayPal®). An account may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The account and/or digital wallet may be loaded with funds or funds may otherwise be added to the account or digital wallet. The application or website of the service provider, such as PayPal® or other online payment provider, may provide payments and the other transaction processing services via the account and/or digital wallet.

Once the account and/or digital wallet of the user is established, the user may utilize the account via one or more computing devices, such as a personal computer, tablet computer, mobile smart phone, or the like. The user may engage in one or more transactions with a recipient, such as a recipient account or digital wallet that may receive an amount of a payment. For example, a service provider may provide electronic transaction processing to users and entities through digital accounts, including consumers and merchants that may wish to process transactions and payments. The service provider may also provide computing services, including email, social networking, microblogging, media sharing, messaging, business and consumer platforms, etc. When performing these operations for sign-up, onboarding, authentication and/or login, transaction generation and processing, and the like, ML models and engines may be deployed and utilized to perform intelligent decision-making, identify risk and fraud, and otherwise execute computing actions with user data processing requests.

In this regard, a service provider system may include a production computing system and/or environment having live production traffic that executes a latest or most current version for an ML model engine and build. When a model upgrade for an ML engine and/or models is required to be deployed, such as multiple ML models for deployment, an ML model package may be received and processed for upgrading. The service provider's system may include a listener that resides in a data processing and machine stack. The listener may include an updatable configuration-based channel that can be used to signal for an exclusion of a non-performant compute item (e.g., an ML model, as a whole when not compliant or performing adequately, or one or more data variables in an ML model that cause performance issue) on-the-fly in the acyclic graph or a directed acyclic graph (DAG) for execution of the ML model across thousands of containers and/or machines.

In order to exclude non-performant compute items from an ML model package upgrade and/or roll-out, as well as exclusion of those compute items during ML model execution, the service provider's system may include a process to flag and skip items from execution in a directed graph or DAG of an ML model. Thus, the system further includes a production processing stack in the production computing system that has a "skip" item feature for nodes of the DAG and/or for an ML model in the ML model package. Nodes in the DAG may correspond to individual ML model variables, which may be connected via connections to form edges that designate the processing flow and execution of individual variables during ML model decision-making. When a skip flag or feature is set, the service provider's system then skips the node in the DAG from execution, or may entirely skip an ML model from deployment, updating, and/or execution. The system routes the "skip" flag of the compute item to a strategy rules and decision layer so that the layer is aware of the non-performant compute item, excludes the non-performant compute item during execution in the production computing system and/or environment, and explores fallback options, if any. The system further routes the skip flag of the compute item when logged to a big data cluster for training purpose, such that training for ML models is aware of the non-performant compute item and excludes those items during training processes.

In addition to identifying and excluding non-performant compute items during ML model deployment, roll-out, and/or updating, the service provider's systems may require directed graphs, such as DAGs for deployable and/or updated ML models. A DAG for an ML model may correspond to a sequence or order of vertices or nodes, connected by connectors to create edges, that identify the execution steps in a computation for the ML model. For example, a DAG may correspond to a subset of directed graphs that does not have directed cycles and instead has edges that proceed in directions without closed cycles or loops that lead back to a previous vertex to close a loop. The vertices or nodes each define one or more computations or ML model variables, such as an executable task or operation having executable instructions to process a data load and return a result used in the ML model decision-making and/or predictive output. For example, a DAG may represent a decision tree for decision tree-type ML algorithms and models (e.g., classification and/or regression trees, including XG Boost, GBM, or the like). In some embodiments, a vertex may correspond to a client device request processor and/or authenticator, a compute for business rules, a user authenticator, variables used in risk analysis, and/or the like. DAGs and other execution directed graphs may include an audit graph, an adjudication graph, an execution graph and/or the like for an ML model.

Thus, the system may further include a pre-production computing system and/or environment (e.g., made up of containers, machines, or computes), which may utilize live production traffic on a set of machines that do not participate in decisioning or adjudication in the live production system. The pre-production computing environment therefore serves as an AB testing environment (e.g., a split testing environment) for executing the latest ML model build for the ML engine with the ML model upgrade for deployment. The pre-production computing environment may mount, utilize, and/or deploy the ML model upgrade for the ML engine from a shared volume accessible by all or a subset of the containers (e.g., machines or computes) in the pre-production computing environment on a READ path (although other paths may be used where necessary). This allows the containers to read the ML models of the ML engine that have the deployment of the ML model upgrade.

Containers/machines in the pre-production computing environment of the service provider's system may then process the ML models, or at least the updated ML models, and then WRITE/PERSIST (e.g., on a WRITE/PERSIST path) the generated execution graphs (adjudication graph, audit graph, execution list graph), or DAGs, of the ML models to the shared volume with the production computing environment. A catalog of the model upgrade and the directed graphs for a release of the ML model upgrade may be maintained in the shared volume with versioning of the ML models in an association map directory for the catalog. The graphs may be several to tens of megabytes in data size and may serve as enhanced metadata for deployment of the ML model for the production pool of containers in the production computing environment. The production pool stack of containers, when upgraded with the ML model upgrade, may utilize the DAGs or other directed graphs with the model upgrade version from the shared volume. The production pool stack may create DAGs and/or other directed graphs as a fallback option when unavailable and may instead rely on pre-production processed graphs for machine warm-up during ML model execution. The pre-production processed graphs may also be utilized for a hot swap of an ML model upgrade with a corresponding execution graph.

Thus, an online transaction processor or other service provider may execute operations, applications, decision services, and the like that may utilize ML models deployed in ML model engines and processors. These may provide intelligent decision-making and predictive outputs for use with risk analysis, authentication and/or fraud detection, account and/or computing service provisioning, and the like. However, deployment of ML models and model upgrades is time-consuming and processor resource intensive. Thus, a service provider's computing systems may utilize the systems, computing environments, containers, and operations discussed herein to reduce deployment and processing times, ATB and TTM of ML solutions, and offline time required for updating. This further reduces the computing, processor, and network resources consumed by such events and allows production computing environments to be more widely available and operate with higher availability to requesting computing devices and systems of end users, clients, customers, and the like.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a client device 110 and a service provider server 120 in communication over a network 150. Client device 110 may be utilized by a user to interact with service provider server 120 over network 150, where service provider server 120 may provide various computing services, data, operations, and other functions over network 150. In this regard, client device 110 may perform activities with service provider server 120 to deploy, update, and/or roll-out ML model packages. Service provider server 120 may receive data for processing, which may be associated with one or more ML models and/or engines for intelligent decision-making and/or predictive outputs. In this regard, service provider server 120 may utilize the systems, containers, and operations described herein in order to perform faster and more efficient ML model roll-out and updating when requested by client device 110.

Client device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Client device 110 may be implemented as a communication device that may utilize appropriate hardware and software configured for wired and/or wireless communication with service provider server 120. For example, in one embodiment, client device 110 may be implemented as a personal computer (PC), a smart phone, laptop/tablet computer, wristwatch with appropriate computer hardware resources, eyeglasses with appropriate computer hardware (e.g. GOOGLE GLASS 0), other type of wearable computing device, implantable communication devices, and/or other types of computing devices capable of transmitting and/or receiving data. Although only one device is shown, a plurality of devices may function similarly and/or be connected to provide the functionalities described herein.

Client device 110 of FIG. 1 contains an ML model application 112, a database 116, and a network interface component 118. ML model application 112 may correspond to executable processes, procedures, and/or applications with associated hardware. In other embodiments, client device 110 may include additional or different modules having specialized hardware and/or software as required.

ML model application 112 may correspond to one or more processes to execute software modules and associated components of client device 110 to provide features, services, and other operations for a user, which may include interactions with service provider server 120 to perform ML model and/or package deployment, roll-out, and/or updating. In this regard, ML model application 112 may correspond to specialized software utilized by a user of client device 110 that may be used to access a website or application (e.g., mobile application, rich Internet application, or resident software application) that may display one or more user interfaces that allow for interaction with service provider server 120. In various embodiments, ML model application 112 may correspond to a general browser application configured to retrieve, present, and communicate information over the Internet (e.g., utilize resources on the World Wide Web) or a private network utilized by client device 110 and service provider server 120 to interact. For example, ML model application 112 may provide a web browser, which may send and receive information over network 150, including retrieving website information, presenting the website information to the user, and/or communicating information to the website. However, in other embodiments, ML model application 112 may include a dedicated application of service provider server 120, which may correspond to a resident software application, or bundle of applications and/or operations for ML model building, training, testing, validating, and/or deploying.

ML model application 112 may be associated with account information and/or identifiers used for identification of the user and/or entity using ML model application 112 for ML model deployment. ML model application 112 may be utilized to enter, view, and/or process data for ML models, as well as generate, access, and/or request deployment of an ML model package 114. ML model package 114 includes one or more ML models, which may be new models for deployment and/or updates to existing ML models, such as new versions and versioning for existing ML models. ML models in ML model package 114 may include one or more variables or other data processing nodes or features in the ML models, which correspond to decisioning branches and/or trees in one or more directed graphs, such as DAGs, that represent a chain of decision-making to result in some predictive output, score, or decision. ML model package 114 may therefore be provided to service provider server 120 in order to determine whether there are any non-performant compute items. Further, service provider server 120 may determine DAGs or other directed graphs for ML models in ML model package 114 that are used during deployment and execution of the ML models in ML model package 114.

Client device 110 may further include a database 116 stored on a transitory and/or non-transitory memory of client device 110, which may store various applications and data and be utilized during execution of various modules of client device 110. Database 116 may include, for example, identifiers such as operating system registry entries, cookies associated with ML model application 112 and/or other applications, identifiers associated with hardware of client device 110, or other appropriate identifiers, such as identifiers used for user/device authentication or identification, which may be communicated as identifying the user/client device 110 to service provider server 120. Moreover, database 116 may store ML models, model variables, model execution graphs and the like, and/or ML model package 114 prior to testing and/or deployment. However, such data may also reside on server-side data resources and databases that are accessible by service provider server 120.

Client device 110 includes at least one network interface component 118 adapted to communicate with service provider server 120 and/or another device or server. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency, infrared, Bluetooth, and near field communication devices.

Service provider server 120 may be maintained, for example, by an online service provider, which may provide operations for use of computing services provided by service provider server 120 including account and electronic transaction processing services. In this regard, service provider server 120 includes one or more processing applications which may be configured to interact with computing devices, such as personal computers, tablet computers, mobile smart phones, and the like. The computing services may be used process transactions, which may include transaction data and financial instrument data, or provide other computing services. In various embodiments, service provider server 120 may utilize one or more ML models and/or engines to provide intelligent decision-making, which may include ML model deployments, roll-outs, and/or updates from client device 110. In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes an ML model deployment application 130, a pre-production computing environment 140, a production computing environment 144, a database 122, and a network interface component 128. Production computing environment 144 may correspond to executable processes, procedures, and/or applications with associated hardware. In other embodiments, service provider server 120 may include additional or different modules having specialized hardware and/or software as required.

ML model deployment application 130 may correspond to one or more processes to execute modules and associated specialized hardware of service provider server 120 to provide services to test, deploy, and/or update ML models during an ML model roll-out for a package having one or more ML models for deploying and/or updating. In this regard, ML model deployment application 130 may correspond to specialized hardware and/or software of service provider server 120 that may be accessible and/or usable by client device 110 to request deployment of ML model package 114. In various embodiments, ML model package 114 includes ML models 134 that may be used for intelligent decision-making and/or predictive outputs and services, such as during the course of providing computing services in production computing environment 144 to end users, customers, entities, and the like via the computing devices and servers. Thus, ML models 134 may be trained to provide a predictive output, such as a score, likelihood, probability, or decision, associated with risk analysis, fraud detection, authentication, account usage and/or maintenance, account recovery or security, customer service and/or dispute resolution, and other computing services provided by service provider server 120.

For example, ML models 134 may include ML or neural network (NN) models trained for intelligent decision-making and/or predictive outputs (e.g., scoring, comparisons, predictions, decisions, classifications, and the like) for particular uses with computing services provided by service provider server 120. When building ML models 134, training data may be used to generate one or more classifiers and provide recommendations, predictions, or other outputs based on those classifications and an ML or NN model algorithm and/or trainer. The training data may be used to determine input features from the input training data and utilize those features to generate ML models having decision trees or other decision-making architectures based on the features. For example, ML models for ML models 134 may include one or more layers, including an input layer, a hidden layer, and an output layer having one or more nodes, however, different layers may also be utilized. As many hidden layers as necessary or appropriate may be utilized. Each node within a layer is connected to a node within an adjacent layer, where a set of input values may be used to generate one or more output values or classifications. Within the input layer, each node may correspond to a distinct attribute or input data type that is used to train ML models for ML models 134, for example, using feature or attribute extraction with training and other related data.

Thereafter, the hidden layer may be trained with these attributes and corresponding weights using an ML algorithm, computation, and/or technique. For example, each of the nodes in the hidden layer generates a representation, which may include a mathematical ML computation (or algorithm) that produces a value based on the input values of the input nodes. The ML algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for ML models 134 that provide an output, classification, prediction, or the like. Thus, when ML models 134 are used to perform a predictive analysis and output, the input may provide a corresponding output based on the classifications trained for ML models 134.

ML models 134 may be trained by using training data and a feature extraction of training features. By providing training data to train ML models 134, the nodes in the hidden layer may be trained (adjusted) such that an optimal output (e.g., a classification) is produced in the output layer based on the training data. By continuously providing different sets of training data and penalizing ML models 134 when the output of ML models 134 is incorrect, ML models 134 (and specifically, the representations of the nodes in the hidden layer) may be trained (adjusted) to improve its performance in data classification. Adjusting ML models 134 may include adjusting the weights associated with each node in the hidden layer. Thus, the training data may be used as input/output data sets that allow for ML models 134 to make classifications based on input attributes and features extracted from the training data. The output classifications for an ML model trained may be classifications and/or predictions resulting from features of further input data to the ML model.

Once trained, production computing environment may utilize ML models 134 to perform intelligent decision-making and predictive outputs. When executing ML models 134, directed acyclic graphs (DAGs) 136 may be used during model execution to determine a sequence or order of execution steps in a computation for the ML model using the nodes or vertices connected to form edges and pathways for DAGs 136, which may not have closed cycles. Each node or vertex corresponds to one or more computations or ML model variables. A computation may be a computing task or operation with executable instructions to process a data load and return a result, advance to another node, generate a score, or otherwise perform the ML model decision-making and/or predictive output. DAGs may, in some embodiments, be used to represent decision trees for decision tree-type ML models. DAGs 136 may be determined by pre-production computing environment 140, as discussed herein. Further, ML model deployment application 130 may determine flags 138 for nodes or vertices corresponding to non-performant compute items to be excluded in DAGs 136. Flags 138 may correspond to exclusion flags or other alerts to exclude one or more non-performant compute items and/or ML models as a whole from execution of ML models 134 in ML model package 114. In this regard, DAGs 136 and flags 138 may be generated by pre-production computing environment 140 and may be used by production computing environment 144 during execution of ML models 134.

Pre-production computing environment 140 may correspond to one or more processes to execute modules and associated specialized hardware of service provider server 120 to provide pre-production computing services on a set of machines corresponding to containers 142 that facilitate ML model deployment, roll-out, and/or updating for ML model package 114 and other ML models and packages. In this regard, pre-production computing environment 140 may correspond to specialized hardware and/or software of service provider server 120 to utilize containers 142 for data processing and ML model building, training, testing, validating, and/or deploying of ML model package 114 when requested by client device 110. Containers 142 may correspond to a set of machines or computes utilized by service provider server 120 in pre-production computing environment 140 for AB testing, model testing and validation, and the like. For example, containers 142 may not participate in decisioning or adjudication in production computing environment 144 and may instead be used to execute ML models 134 in ML model package 114 for model deployment. This may include model testing to identify non-performant compute items and generating flags 138 for those non-performant compute items, as discussed herein. Further, pre-production computing environment 140 may be used to generate DAGs 136 for ML model execution, as discussed herein.

Production computing environment 144 may correspond to one or more processes to execute modules and associated specialized hardware of service provider server 120 to provide services for account usage, digital electronic communications, electronic transaction processing, and the like, as well as one or more other computing services to end users of service provider server 120. In this regard, production computing environment 144 may correspond to specialized hardware and/or software used by end users, customers, clients, entities, and the like to utilize one or more computing services. Production computing environment 144 may be provided by, and perform processes and executable task through, containers 146. Containers 146 may correspond to the production pool or processing stack of machines or computes that provide the corresponding computing services to users in or via production computing environment 144 using service applications 148. Service application 148 may further be associated with deployed ML models 149 used to perform intelligent decision-making processes and/or provide predictive outputs, classifications, recommendations or the like.

In this regard, containers 146 for production computing environment 144 may be used to provide and/or execute service application 148. Services applications 148 may correspond to the software applications, application programming interfaces (APIs) to execute calls between applications and systems, and other data resources and processors to provide computing services to users, entities, computing devices, and servers. In some embodiments, service applications 148 may be used by a user to establish a payment account and/or digital wallet, which may be used to process transactions. In various embodiments, financial information may be stored to the account, such as account/card numbers and information. A digital token for the account/wallet may be used to send and process payments, for example, through an interface provided by service applications 148. The payment account may be accessed and/or used through a browser application/extension and/or dedicated payment application and engage in transaction processing through production computing environment 144.

In various embodiments, service applications 148 may receive transaction data from a computing device or server and process the transaction data. For example, electronic transaction processing operations may utilize transaction and financial instrument data (e.g., payment card data) from transaction data to process the transaction with a backend processing gateway or service. Service applications 148 may process the transaction and may provide a transaction history for transaction authorization, approval, or denial. Service applications 148 may further include messaging, social networking, media posting or sharing, microblogging, data browsing and searching, online shopping, and other services available through service provider server 120. Each of these computing services may utilize and execute deployed ML models 149. Further, in order to assist in machine warm-up and/or execution of deployed ML models 149, DAGs 136 and/or model catalogs 124 from database 122 may be retrieved and utilized in production computing environment 144. Skips of non-performant compute items and/or ML models may be performed using flags 138 and/or model flags 126 from database 122 in production computing environment 144. Based on the availability and/or usage of model catalogs 124, model flags 126, DAGs 136, and/or flags 138, production computing environment 144 may explore and determine fallback options for model execution, availability of a DAG for execution, and/or exclusion of a compute item.

Additionally, service provider server 120 includes database 122. Database 122 may store various identifiers associated with client device 110. Database 122 may also store account data, including payment instruments and authentication credentials, as well as transaction processing histories and data for processed transactions. Database 122 may store financial information or other account data generated and/or stored by production computing environment 144 using service applications 148. Database 122 may also include data and computing code, or necessary components for ML models 134. Database 122 may also include stored model catalogs 124 that may include data for ML model versions, ML model DAGs (e.g., DAGs 136), and the like for use in ML model execution, as well as model flags 126 for use in ML model training and/or exclusion of non-performant compute items or models.

In various embodiments, service provider server 120 includes at least one network interface component 128 adapted to communicate client device 110 and/or other devices or server over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
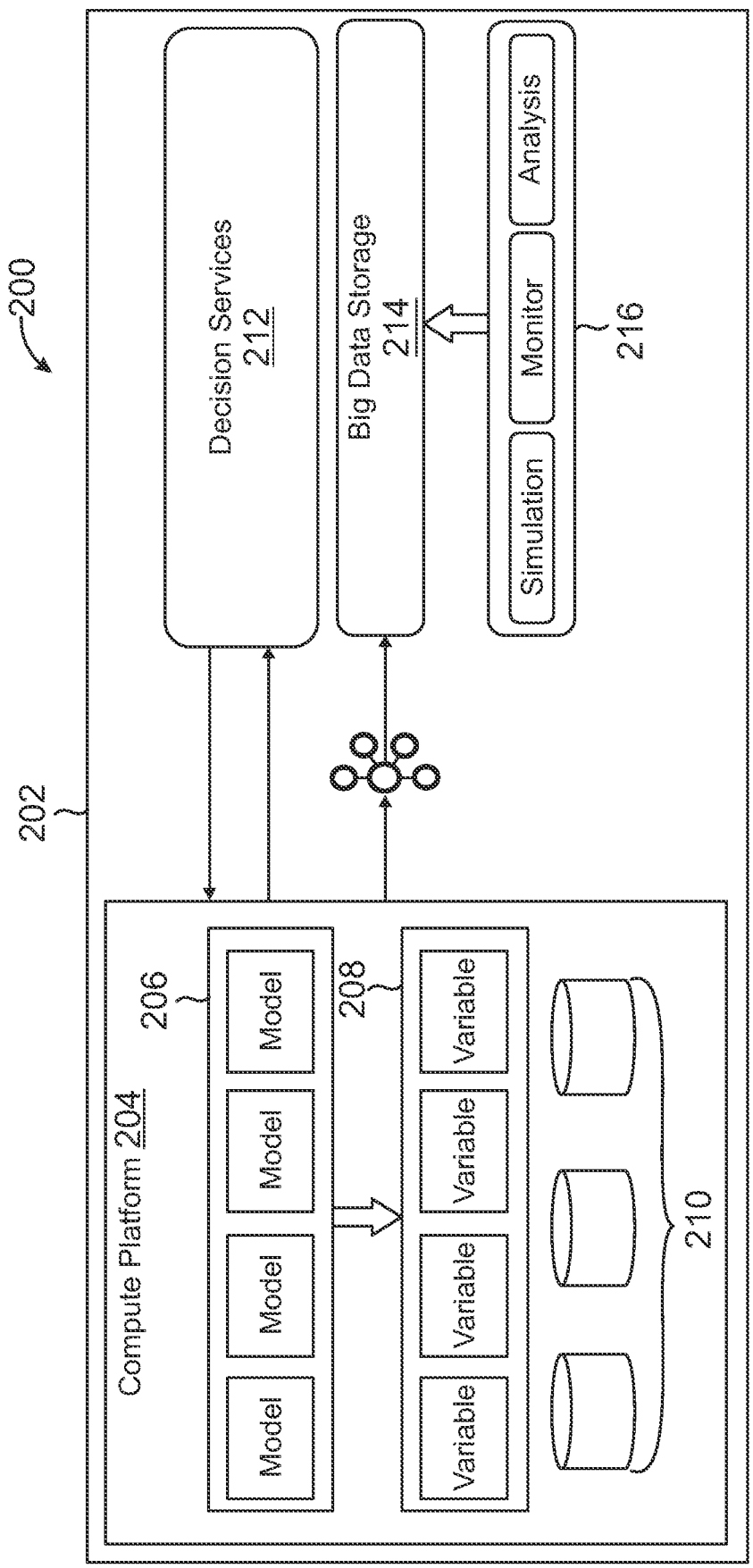
FIG. 2 is an exemplary computing environment for a machine learning engine, according to an embodiment.

FIG. 2 is an exemplary computing environment 200 for a machine learning engine, according to an embodiment. Computing environment 200 includes ML platform 202 corresponding to the systems and services of service provider server 120, discussed in reference to system 100 of FIG. 1. Computing environment 200 includes a compute platform 204 for ML model testing training, testing, validating, deploying, and/or executing with decision services 212. For example, the ML models from compute platform 204 may be executed in run-time to provide intelligent decision-making using ML models with decision services 212. In this regard, decision services 212 may be used by applications and computing services of service provider server 120, such as service applications 148 discussed in reference to system 100.

In computing environment 200, compute platform 204 of ML platform 202 includes ML models 206 having model variables 208 running using data accessible from databases 210. Compute platform 204 may provide the core intelligent decision-making for one or more computing services, applications, and/or platforms provided by service provider server 120. ML models 206 may correspond to different types of ML models, such as linear regression models, NN models, deep learning and deep NN models, gradient boosting models, decision tree models, and model combinations including GBM, XGBoost, etc. Variables 208 may correspond to the features that are measurable and/or scoreable so that a decision may be made at each variable and corresponding node or vertex in a directed graph or DAG. Thus, variables 208 may correspond to the input and output (e.g., independent and dependent variables, respectively) of an analytical process for the mathematical computation occurring in ML models 206. Variables 208 may correspond to features or attributes that are analyzed and used to make a decision (which may be a sub-decision before an ML model output decision or prediction) based on the weights and mathematical computations learned from the training data and ML model algorithm.

Databases 210 may store and make accessible data for the execution of ML models 206 with variables 208, include directed graphs and/or DAGs, model weights and/or scoring attributes and features, and the like. Databases 210 may include different types of databases, query languages, database structures and tables, and lookup operations. For example, databases 210 may correspond to Oracle® or Amazon® databases, such as Amazon Web Services® (AWS®) cloud storage and/or cloud computing systems and environments. Databases 210 may further include graph-based databases and database query languages and operations, such as those that may be queried for graphs, nodes, connectors, and edges in directed graphs, DAGs, and the like. Thus, graph databases may be used to query and return search results corresponding to graphs of nodes and/or vertices that may be used with ML model execution, such as execution graphs and/or DAGs.

Compute platform 204 may be accessed and/or utilized by decision services 212, such as by deployment of one or more of ML models 206 having one or more of variables 208 to decision services 212. Decision services 212 may correspond to those computing services, applications, and platforms to execute ML models 206 and perform decision-making during runtime and in respond to data processing requests and data loads from computing devices and servers. For example, when utilizing the services of service provider server 120, decision services 212 may be used for intelligent decision-making operations with computing services. Service provider server 120 may provide services associated with electronic transaction processing, including account services, user authentication and verification, digital payments, risk analysis and compliance, and the like. To provide these services, decision services 212 may implement automated and intelligent decision-making operations and engines, including ML models and engines based on compute platform 204 that automate certain decision-making processes. These decision services may be used for risk analysis, fraud detection, and the like to determine if, when, and how a particular service may be provided to users. Thus, decision services 212 may automate repeatable decisions based on decision modeling capabilities.

ML platform 202 in computing environment 200 further includes a big data storage 214 that may store data regarding execution of ML models 206 and/or variables 208. For example, big data storage 214 may be used for training and/or updating ML models 206 and/or other ML models. In this regard, big data storage 214 may be used to store execution graphs and other graphs for the ML models, as well as flags of non-performant compute items for ML model training. Big data storage 214 may be used to store training data, performant and non-performant compute items or variables, and the like. ML platform 202 further include ML deployment components 216, which may include a simulation, monitor, and/or analysis component used during testing, deployment, and/or updating of ML models. For example, ML deployment components 216 may be used to test ML models 206 for model performance and/or non-performant compute items, flag such items, and/or determine DAGs and other execution graphs, as discussed with reference to FIGS. 3A-3C. ML deployment components 216 may then be used to store deployment, roll-out, and/or update data for ML models 206 with big data storage 214.

Figure 3A:
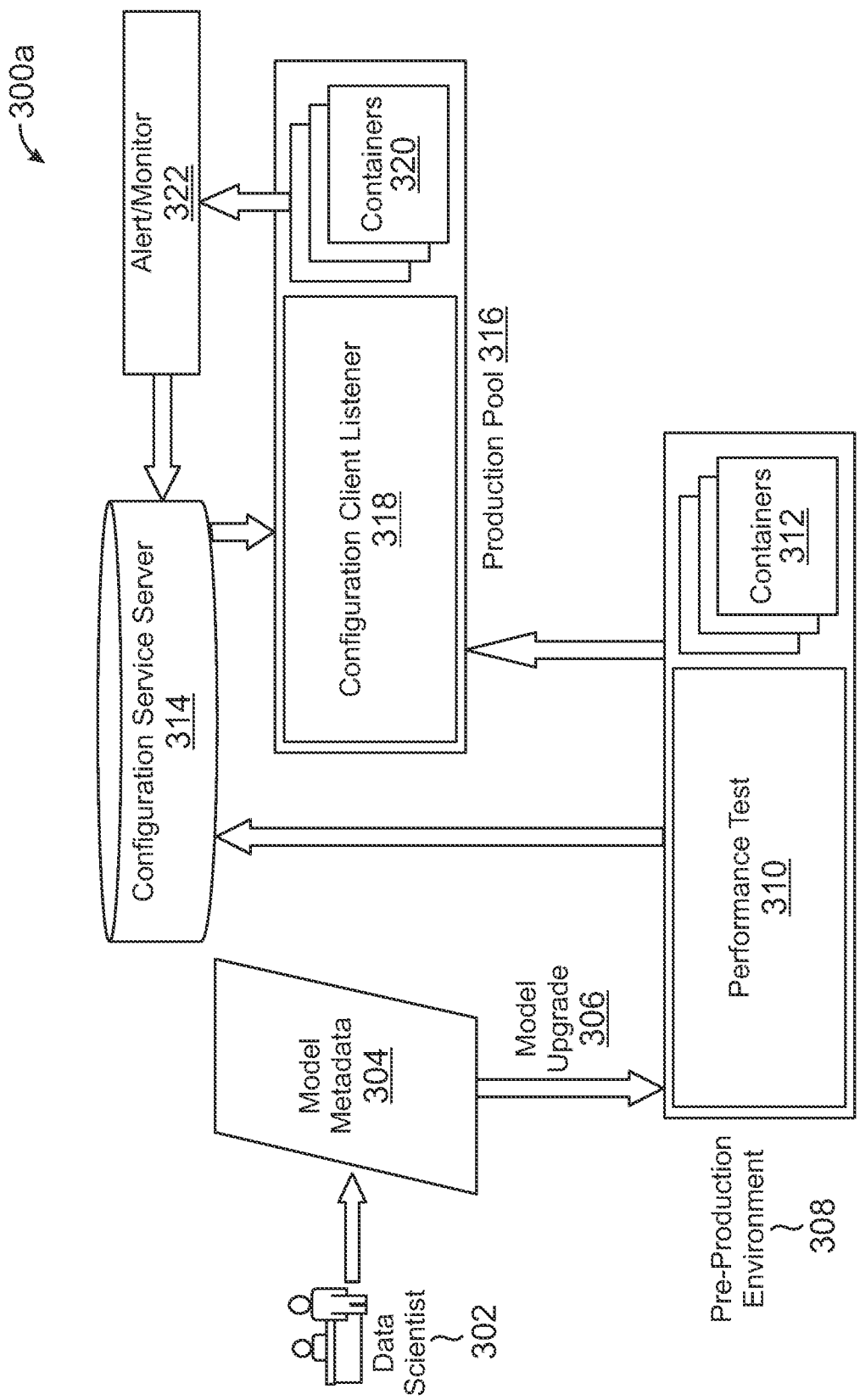
FIGS. 3A-3C are exemplary diagrams for determining non-performant machine learning models and providing directed acyclic graph deployment for more efficient model roll-out, according to an embodiment.
Figure 3B:
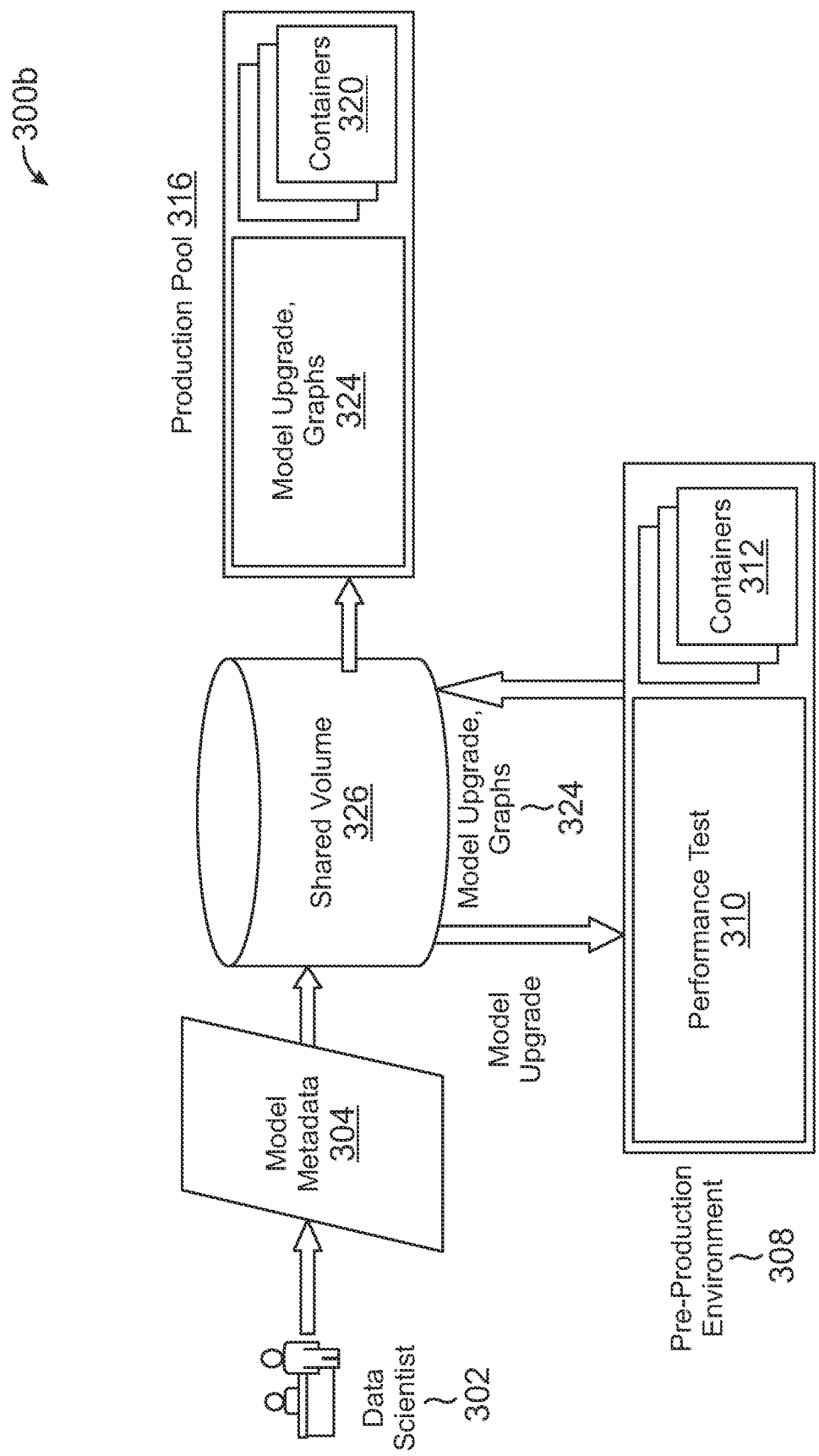
Figure 3C:
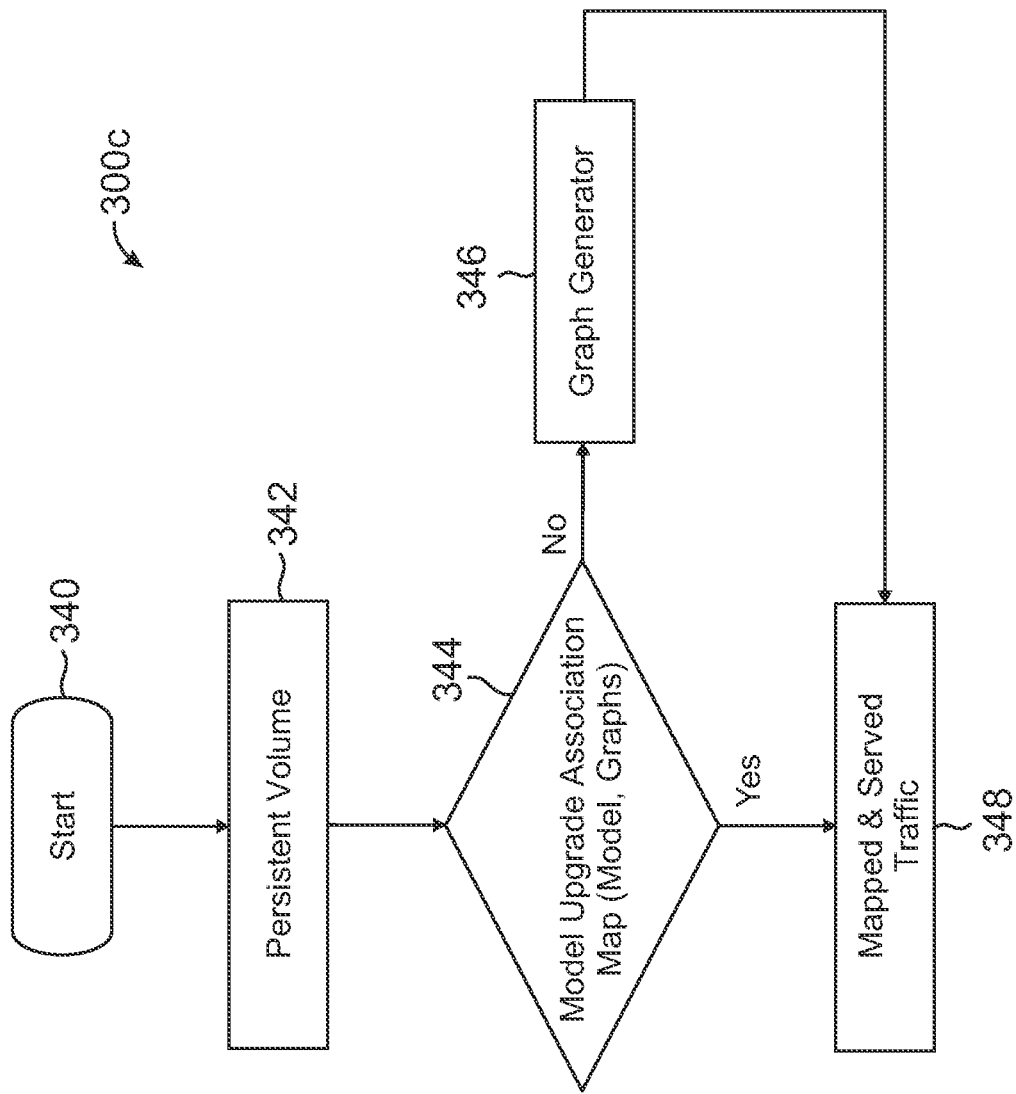

FIGS. 3A-3C are exemplary diagrams 300a, 300b, and 300c for determining non-performant machine learning models and providing directed acyclic graph deployment for more efficient model roll-out, according to an embodiment. Diagram 300a includes a representation of interactions and communications between components when flagging and excluding non-performant compute items during ML model deployment, roll-out, and/or update. Diagram 300b includes a representation of interactions and communications between components when generating and storing DAGs or other directed graphs for ML model execution prior to ML model deployment or update. Diagram 300c includes a representation of operations for generating the DAGs or other directed graphs in a pre-production computing environment. In this regard, service provider server 120 may execute the operations for communications and interactions between components represented in diagrams 300a-300c.

In diagram 300a, a data scientist 302 may initially provide model metadata 304 for creating, training, and/or deploying one or more ML models in a model upgrade 306 having an ML model package with one or more ML models. Model metadata 304 may include the layers, nodes, features, events, and other data that are used to generate and execute the ML model, such as the data and metadata that may be used for the trained layers (e.g., input, hidden, and output layers), nodes within the layers (e.g., their mathematical representation and/or calculations, including the variables for computations by the ML model), and the like. Model metadata 304 may be used to generate and/or determine model upgrade 306 having the one or more ML models for deployment and/or update in production pool 316. Model upgrade 306 therefore includes the ML models that are to be deployed and/or updated in a production pool 316. Production pool 316 may correspond to a set or pool of machines corresponding to containers 320 that are used in the production computing system or environment, such as a production processing stack for containers 320.

In order to determine non-performant compute items in model upgrade 306, pre-production environment 308 may be utilized, which may provide a testing environment for a performance test of model upgrade 306 on a non-production set of machines or other computes, such as containers 312. Pre-production environment 308 may execute performance test 310 of model upgrade 306 using live production traffic from production pool 316 (e.g., live data in a production computing environment, such as that data incoming from executed operations, services, and ML models using production pool 316). However, containers 312 correspond to a set of machines that do not participating in decisioning or adjudication in production pool 316, and therefore do not affect the machines and their availability, processing time and resources, and the like in production pool 316. This allows for roll-out with a lower or no effect to ATB and TTM for production pool 316 and the corresponding ML models.

Pre-production environment 308 may serve as an A/B, split, or other testing environment for executing the ML engine and/or models for model upgrade 306 used in production pool 316.

If non-performant compute items are detected in model upgrade 306, such as if a variable is failing or causing inconsistent or inaccurate result or if an ML model itself is failing, inaccurate, or causing timeouts, a configuration service server 314 may interface with pre-production environment 308 to generate flags, such as exclusion flags and/or an exclusion list, of the non-performant compute items in model upgrade 306. These non-performant compute items may be determined from the live production traffic, and configuration service server 314 may generate exclusion or skip flags for an operation of production pool 316 to skip such non-performant compute items. The flags may also delay or prevent deployment of the ML models and/or non-performant compute items (e.g., by deploying other ML models in model upgrade 306 but holding back or skipping deployment or execution of the non-performant compute items and/or ML model).

Production pool 316 further includes a configuration client listen 318 that may listen and/or detect exclusion or skip flags for the non-performant compute items, and execute a skip of those compute items during deployment and/or execution of ML models from model upgrade 306. Configuration client listener 318 may reside the processing stack for production pool 316 and utilize an updatable channel to listen and signal for exclusions of non-performant compute items in production pool 316. Thus, when containers 320 execute ML models associated with model upgrade 306, configuration client listener 318 may receive flags of non-performant compute items from configuration service server 314 and signal for their exclusion from execution by containers 320 during ML model usage and intelligent decision-making. This exclusion may be performed on-the-fly using and/or in the directed graph or DAG of the corresponding ML model and/or decision service.

Production pool 316 may include a skip item feature for nodes or vertices of the DAG or other graph that have been flagged for skipping and/or exclusion as non-performant compute items. Configuration client listener 318 may route the skip flag to a strategy rules and decision layer of production pool 316 for identification of the non-performant compute item to exclude and usage of a fallback option if available. Additionally, configuration service server 314 and/or configuration client listener 318 may route the flag to a big data cluster for ML model training purposes. Further, an alert/monitor 322 may be used to determine if a data source degrades for an ML model and/or variable, which may then communicate with configuration service server 314 to further flag non-performant compute items causing this degradation and/or issues with ML model execution. These flags may similarly be provided to configuration client listener 318 in production pool 316 to exclude the flagged non-performant compute items.

In diagram 300b of FIG. 3B, during ML model deployment, roll-out, and/or updating, directed graphs and/or DAGs may be required for deployment, update, and/or execution of ML models in model upgrade 306. In this regard, diagram 300b similarly shows data scientist 302 providing model metadata 304 for model upgrade 306. In diagram 300b, in order to pre-process and determine directed graphs, DAGs, or the like for ML models used during execution, such as audit graphs, adjudication graphs, and/or execution graphs, and the like. Model upgrade graphs 324 may include these DAGs and other graphs used with ML models for model upgrade 306. In order to determine model upgrade graphs 324, model upgrade 306 having model metadata 304 is mounted, stored, and/or partitioned in a shared volume 326 for access and use by containers 312 in pre-production environment 308, as well as containers 320 in production pool 316.

In pre-production environment 308, when executing performance test 310 of model upgrade 306 from shared volume 326 (e.g., using containers 312 in pre-production environment 308), model upgrade graphs 324, such as DAGs for audit, adjudication, and execution of ML models, may be determined. Containers 312 from pre-production environment 308 may access model upgrade 306 from shared volume 326 on a READ path, which allows for reading of the ML models and processing the ML models. When reading and processing the ML models, including model metadata 304 for the layers, nodes, features, and events of the ML models, directed graphs and/or DAGs may be determined for model upgrade graphs 324. Containers 312 may then WRITE/PERSIST model upgrade graphs 324 of the ML models to shared volume 326 for accessibility by production pool 316.

Shared volume 326 and/or another database or data repository may further include a model catalog of model upgrade 306 having model upgrade graphs 324. Further, the model catalog may document and/or record the model upgrade, release, and versioning of the ML models and corresponding DAGs for each model, as well as changes over time to the DAGs. Thus, shared volume 326 may retain the model catalog for a versioning of the ML models in an association map directory for the catalog, which may further may to the corresponding DAGs. Model upgrade graphs 324 may then be used by production pool 316 as enhanced metadata during release and/or deployment of model upgrade 306, which may utilize the DAGs with decision services instead of creating the DAGs for model upgrade graphs 324 using containers 320. However, if one or more DAGs is unavailable and/or requires updating, containers 320 may be utilized and/or fallback options may be executed. Production pool 316 may access and retrieve model upgrade graphs 324 from shared volume 326 and may utilize model upgrade graphs 324 during ML model execution and/or machine warm-up for containers 320.

Diagram 300c in FIG. 3C shows interactions between components, such as those components explained in regard to diagram 300b, for DAG graph generation and/or loading is shown. In this regard, from a start 340, a persistent volume 342 is accessed, which may correspond to a shared volume that may be accessible by different containers in a pre-production and production computing environment. Persistent volume 342 may correspond to a storage area, node, database, cache, or the like that may be used to mount, test, and/or execute ML models and/or ML model packages for model upgrades. From persistent volume 342, it is determined whether a model upgrade association map 344 exists. The model upgrade association map 344 may include ML models and DAGs used for deployment, updating, and/or execution of a model package and/or upgrade.

If model upgrade association map 344 does not exist, a graph generator 346 is invoked to generate the DAGs for the model package and/or upgrade. The DAGs may be generated by a pre-production pool using the model package and/or upgrade mounted in persistent volume 342. This may be done by invoking the ML model and/or metadata to determine a DAG for each model and persisting the DAGs with the ML models and versioning to a model catalog having model upgrade association map 344. Thereafter, model upgrade association map 344 may be found and accessed from persistent volume 342. Once created and/or if determined to previously exist, then mapped and served traffic is provided from persistent volume 342. Mapped and served traffic may correspond to the model package and/or upgrade, the DAGs for machine warm-up and model execution, and/or the versioning and other data or metadata used for ML model deployment.

Figure 4A:
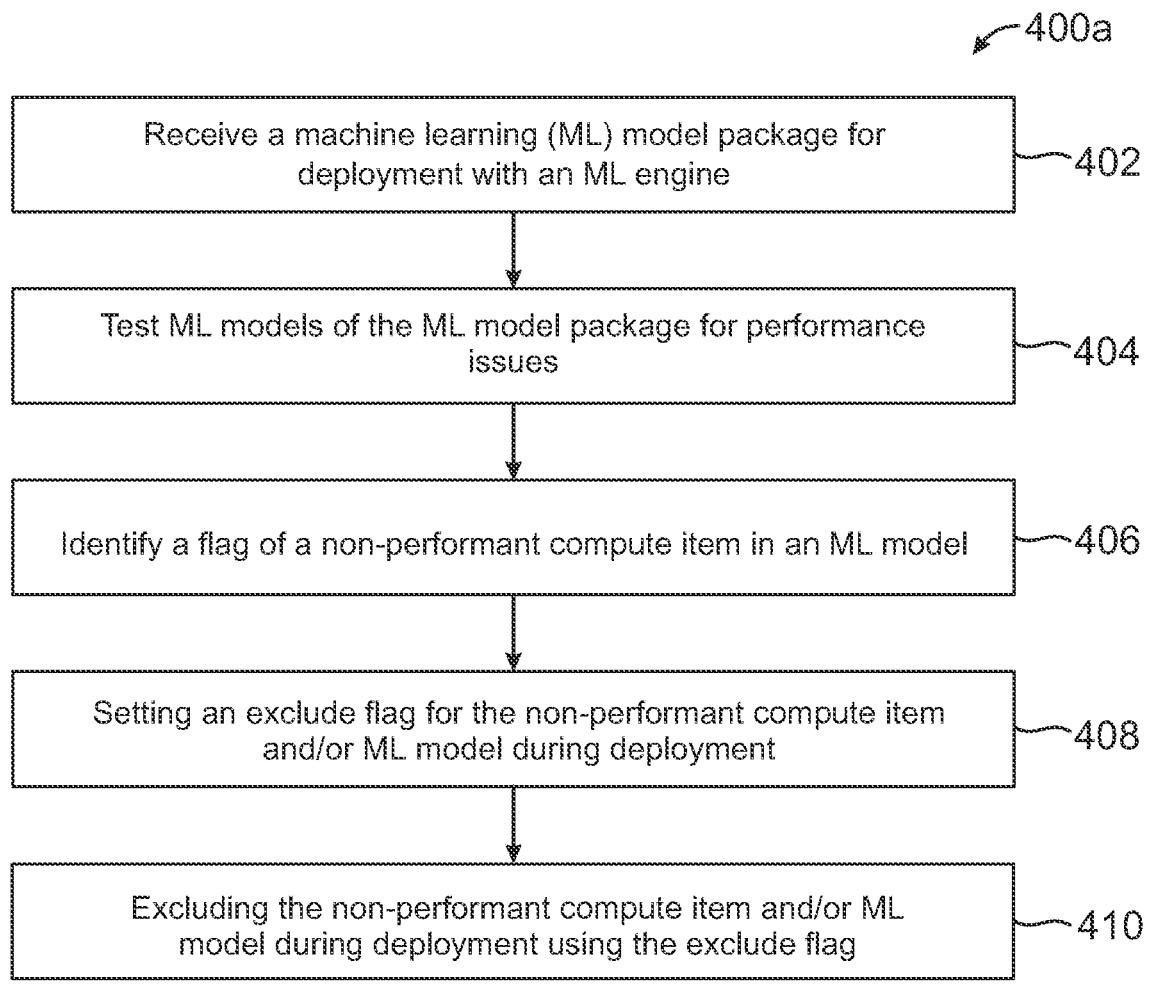
FIG. 4A is a flowchart for identifying non-performant compute items and/or machine learning models in a machine learning model roll-out, according to an embodiment.

FIG. 4A is a flowchart 400a for identifying non-performant compute items and/or machine learning models in a machine learning model roll-out, according to an embodiment. Note that one or more steps, processes, and methods described herein of flowchart 400a may be omitted, performed in a different sequence, or combined as desired or appropriate.

At step 402 of flowchart 400a, an ML model package for deployment with an ML engine is received. The ML model package may include multiple ML models, each of which is for a new deployment or ML model upgrade, such as to a new version of the ML model. In this regard, the ML models include variables having computations and other executable instructions to perform certain decision-making based on scores or other mathematical computations of the trained ML models. The ML models in the ML model package may be used by decision services of an online service provider's system and platform to provide intelligent decision-making when utilizing computing services to other computing devices and/or servers.

At step 404, the ML models of the ML model package are tested for performance issues. Testing of the ML models may occur in a pre-production computing environment, as well as a production computing environment, using containers or sets of machines. When testing, non-performant compute items may be detected and identified, such as those compute items that cause errors or issues in execution of an ML model, such as inconsistencies and/or inaccuracies, timeouts, exploitations or exploitable loopholes, errors, and the like. Thus, the non-performant compute items may correspond to one or more individual variables in an ML model, as well as the ML model itself. When detected, a configuration service server interacting with the performance test of the ML model package sets flag(s) for the non-performant compute item(s)

At step 406, a flag of the non-performant compute item is identified. For example, a listener in communication with the configuration service server may receive and/or detect a flag of the non-performant compute item, where the listener may reside in a production computing environment and processing stack that executes the ML models during runtime of decision services. Once identified by the listener, at step 408, the listener sets an exclude flag for the non-performant compute item and/or ML model during deployment. The exclude flag causes a skip or exclude feature within the production processing pool and stack to exclude the non-performant compute item from deployment and/or execution, thereby preventing the issue caused by the non-performant compute item.

At step 410, the non-performant compute item and/or ML model is excluded during the deployment using the exclude flag. This may cause the non-performant compute item to be excluded from deployment and/or when executed after deployment. For example, the non-performant compute item may be excluded just from execution where upgrading and fixing the non-performant compute item may be successfully achieved after deployment. However, the non-performant compute item may also be excluded from deployment and/or removed after deployment is replacement is needed. Further, the exclude flag may cause the production processing pool and stack to determine one or more fallback options, such as past versions of the ML model that are available, secondary ML models and/or decision services, and/or business rules coded for specific decision-making to be invoked in place of the non-performant variable and/or ML model. Thus, past versions may be used to lookup ML models that may be properly executed in place of non-performant models.

Figure 4B:
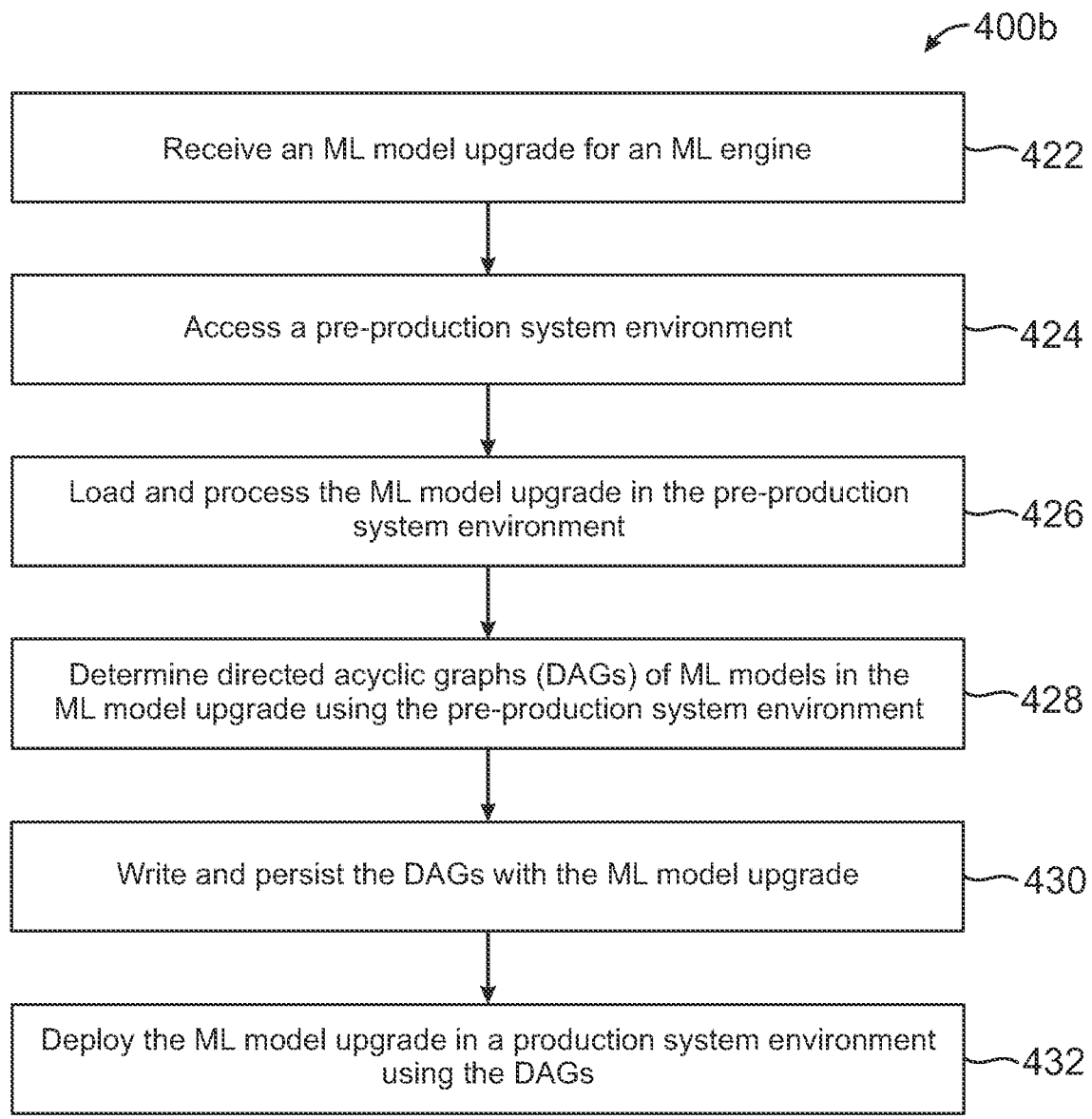
FIG. 4B is a flowchart for determining directed acyclic graphs of machine learning models for use during a machine learning model roll-out, according to an embodiment.

FIG. 4B is a flowchart 400b for determining directed acyclic graphs of machine learning models for use during a machine learning model roll-out, according to an embodiment. Note that one or more steps, processes, and methods described herein of flowchart 400b may be omitted, performed in a different sequence, or combined as desired or appropriate.

At step 422 of flowchart 400b, an ML model upgrade for an ML engine is received. The ML model upgrade may correspond to an ML model package having multiple ML models for deployment and/or upgrading with a new version or may correspond to a single model for upgrading. At step 424, a pre-production system environment is accessed. The pre-production system environment may consist of a set of machine, computes, or other containers that may be used as a testing environment and therefore does not perform decisioning and adjudication in the production system environment by containers that may execute ML models and decision services.

At step 426, the ML model upgrade is loaded and processed in the pre-production system environment. This may include mounting the ML model upgrade in a shared persistent volume accessible by the pre-production and production system environments, such as a shared storage and/or execution space. The ML model upgrade may then be accessed and processed by the pre-production system environment to determine execution flows for ML model decision-making by the ML model upgrade. For example, the ML models may be processed to determine the variables and the processing flows, trees, or the like between variables and other computations of the ML models.

At step 428, DAGs of the ML models in the ML model upgrade are determined using the pre-production system environment. The pre-production system environment allows determination of the DAGs without using the containers in the production system environment, thereby affecting processing availability, resources, and/or speeds in the production system environment. The DAGs may correspond to the execution graphs that may be used for machine warm-up and execution in the production system environment of the ML models. At step 430, the DAGs are written and persisted with the ML model upgrade. This may be done to a model catalog and/or model versioning or association map that provides data and metadata for the ML model upgrade. The DAGs may be persisted with the ML models in the shared persistent volume so that the DAGs are accessible by the production system environment. At step 432, the ML model upgrade is deployed in a production system environment using the DAGs. The production system environment may access and utilize the DAGs with the ML model upgrade from the shared persistent volume, which may provide the model catalog for ML model deployment and/or execution. Thereafter, if a DAG does not exist, is found faulty, or in need of an update, the production system environment may generate a DAG as a fallback option or a new DAG may be requested from the pre-production system environment.

Figure 5:
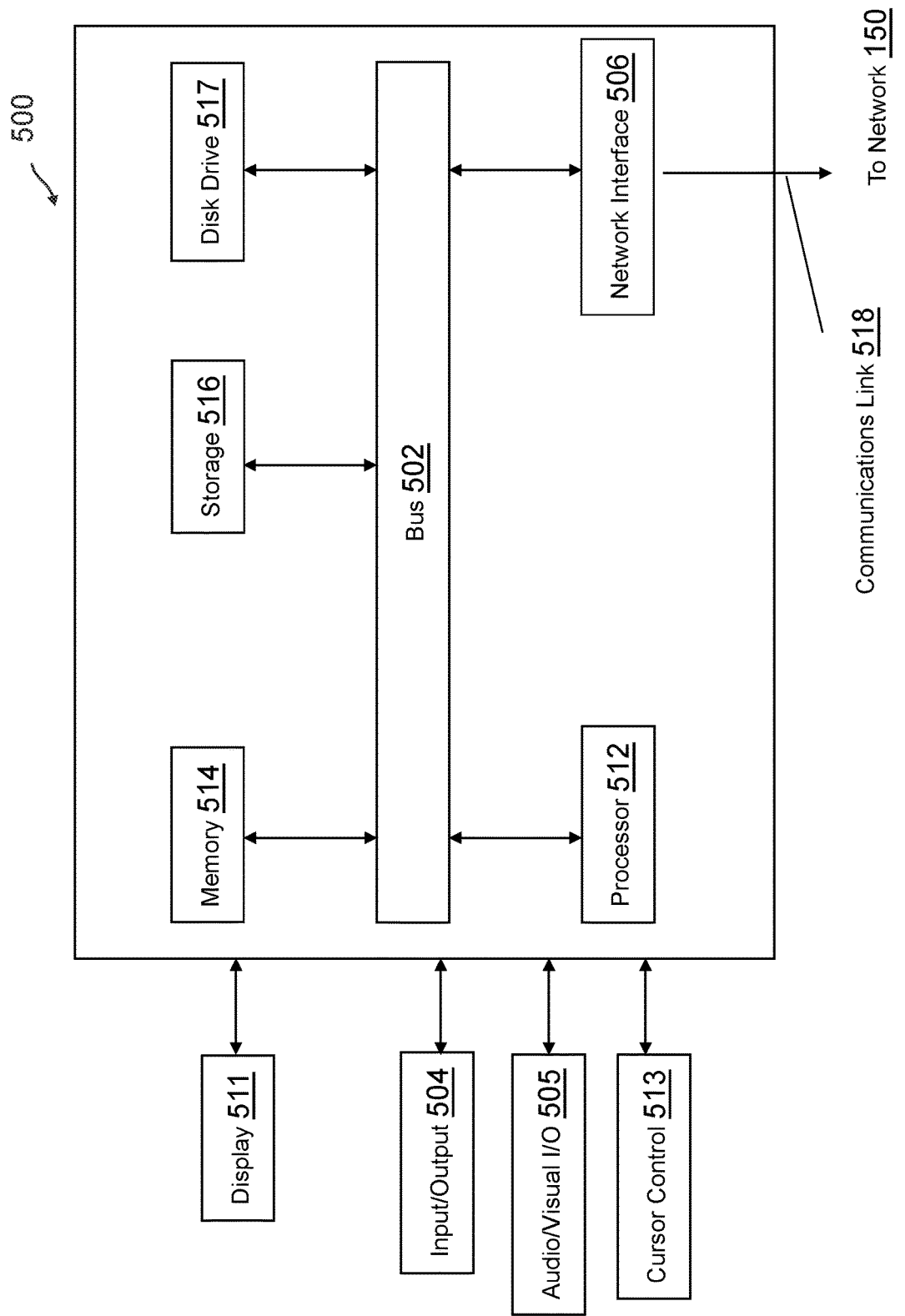
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system comprising:
a non-transitory memory; and
one or more hardware processors coupled to the non-transitory memory and configured to read instructions from the non-transitory memory to cause the service provider system to perform operations comprising:
receiving a machine learning (ML) model package for a deployment in a production computing environment, wherein the ML model package includes an ML model having a plurality of compute items and a non-performant compute item flag of a first one of the plurality of compute items;
identifying the first one of the plurality of compute items in an execution graph of the ML model;
skipping the first one of the plurality of compute items in the execution graph based on the non-performant compute item flag;
deploying, with a corresponding ML engine in the production computing environment, the ML model with the first one of the plurality of compute items skipped in the execution graph of the ML model, wherein the execution graph is accessible from a shared volume for the production computing environment;
receiving an execution request of the ML model by the corresponding ML engine for an output;
determining, from the shared volume, the execution graph having the first one of the plurality of compute items skipped; and
executing the ML model using the ML engine in the production computing environment based on the execution graph, wherein the executing includes parsing the execution graph for the plurality of compute items and causing the first one of the plurality of compute items to be skipped by the ML engine.

2. The service provider system of claim 1, wherein the operations further comprise:
testing the ML model for a threshold performance requirement of a ML model decision-making process during a runtime of the ML model; and
determining that the ML model is a non-performant ML model based on the testing,
wherein the identifying is performed in response to the determining.

3. The service provider system of claim 2, wherein the operations further comprise:
determining the one or more non-performant compute items in the first ML model based on the testing; and
flagging the first one of the plurality of compute items with the non-performant compute item flag for an exclusion from the ML model decision-making process during the runtime of the first ML model,
wherein the identifying is based on the flagging.

4. The service provider system of claim 2, wherein the threshold performance requirement is associated with at least one of a model score threshold, a model accuracy threshold, or a release criterion for the ML model decision-making process, and wherein the flagging identifies the first one of the plurality of compute items as exploitable, corrupted, or requiring a removal from the ML model during a future update.

5. The service provider system of claim 1, wherein the operations further comprise:
determining a fallback option comprising one of a fallback compute item or a fallback ML model for the ML model,
wherein the ML model is deployed with the fallback option.

6. The service provider system of claim 1, wherein the operations are performed using an audit pool of computing containers separate from a production computing environment, and wherein a configuration service server of the audit pool of computing containers causes the first one of the plurality of compute items to be skipped in the execution graph of the ML model in an ML model engine where the ML model package is deployed.

7. The service provider system of claim 6, wherein causing the first one of the plurality of compute items to be skipped is performed by a listener component for the non-performant compute item flag, and wherein the listener component comprises an updatable configuration-based channel used to signal an exclusion of the first one of the plurality of compute items during the deploying based on the non-performant compute item flag.

8. The service provider system of claim 7, wherein the listener component is provided in the production computing environment and interfaces with the configuration service server from the audit pool of computing containers.

9. The service provider system of claim 1, wherein the operations further comprise:
determining, by a decision service in the production computing environment, one of a default model, a default model version, or a default compute item executable in place of at least one of the ML model or the first one of the plurality of compute items when the first one of the plurality of compute items is skipped in the execution graph.

10. A method comprising:
receiving a deployment request of a machine learning (ML) model for an ML engine deployed in a production system environment of a service provider;
determining, in a pre-production system environment separate from the production system environment, an execution graph for the ML model, wherein the execution graph comprises a plurality of compute items connected in one or more sequences executable by the ML model for a ML model decision-making process;
persisting, from the pre-production system environment, the execution graph to a shared data storage between the production system environment and the pre-production system environment;
flagging a first one of the plurality of compute items with a skip flag used based on an indication that the first one of the plurality of compute items is a non-performant compute item, wherein the skip flag indicates that the first one of the plurality of compute items is to be skipped when executing the one or more sequences for the ML model decision-making process by the ML model, wherein the execution graph is accessible from a shared volume for the production system environment; and
executing the ML model using the ML engine in the production system environment based on the execution graph, wherein the executing includes parsing the execution graph for the plurality of compute items and causing the first one of the plurality of compute items to be skipped by the ML engine.

11. The method of claim 10, further comprising:
testing the ML model for a threshold performance and identification of non-performance compute items,
wherein the flagging is performed in response to the testing.

12. The method of claim 11, further comprising:
determining the first one of the plurality of compute items in the ML model based on an execution of the ML model during the testing.

13. The method of claim 10, wherein the threshold performance is associated with at least one of a model score threshold, a model accuracy threshold, or a release criterion for the ML model decision-making process.

14. The method of claim 10, wherein the flagging the first one of the plurality of compute items includes providing a fallback compute item in place of the first one of the plurality of compute items, wherein the fallback compute item is executed in place of the first one of the plurality of compute items based on the skip flag during the one or more sequences.

15. The method of claim 14, wherein the fallback compute item is associated with a past compute item in a past ML model or an execution of the past ML model.

16. The method of claim 10, wherein the pre-production system environment comprises an audit pool of computing containers maintained separate from the product system environment, and wherein the method further comprises:
deploying the ML model from the pre-production system environment to the production computing environment using a model configuration service and the audit pool of computing containers.

17. The method of claim 10, wherein the causing the first one of the plurality of compute items to be skipped uses a listener component for ML model executions in the production computing environment.

18. The method of claim 10, further comprising:
receiving an update to one of the ML model of the first one of the plurality of compute items; and
removing the skip flag based on the update.

19. A non-transitory machine-readable medium having stored thereon machine-readable instructions executable to cause a machine to perform operations comprising:
auditing ML models in an audit pool of machines for a pre-production computing environment for non-performant model variables during executions of the ML models;
accessing one of the ML models to be deployed in a production computing environment, wherein the one of the ML models comprises a plurality of ML model variables for compute items executable in one or more sequences for the one of the ML models;
auditing the one of the ML models with the audit pool of machines;
identifying, based on the auditing the one of the ML models, one of the non-performant model variables for the one of the ML models;
causing the one of the non-performant model variables to be skipped in an execution graph for the one of the ML models based on the identifying; and
executing the one of the ML models based on the execution graph, wherein the executing includes parsing the execution graph for the non-performant model variables and causing the one of the non-performant model variables to be skipped when executing the one of the ML models.

20. The non-transitory machine-readable medium of claim 19, wherein the auditing comprises:
testing the one of the ML models for a threshold performance; and
determining that the one of the ML models is a non-performant ML model based on the testing,
wherein the identifying is performed in response to the determining.

* * * * *